March 1, 1949. F. M. LIEBAU 2,462,979
CLAMP ATTACHMENT FOR PORTABLE DRILLS
Filed Sept. 11, 1945
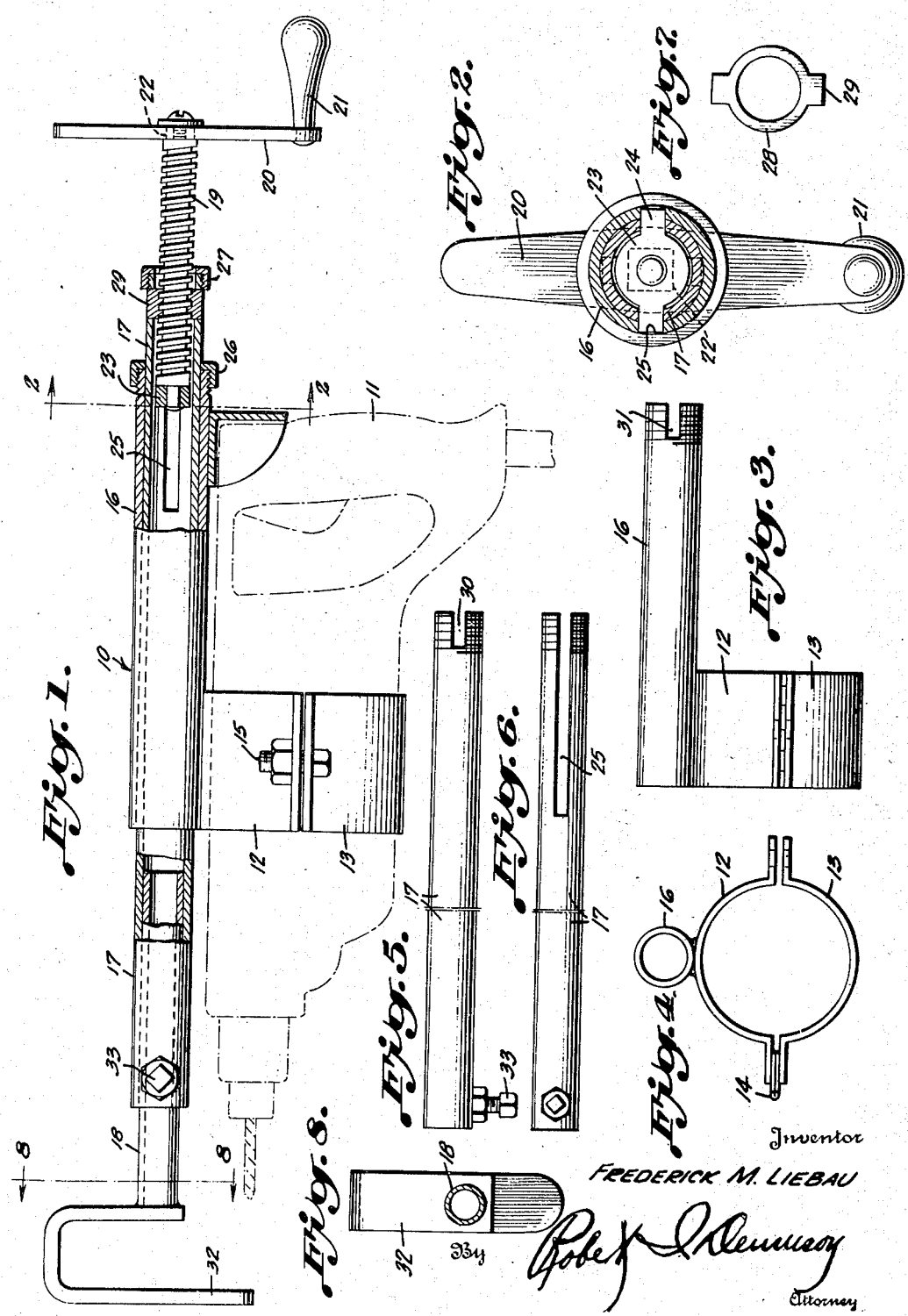
Inventor
FREDERICK M. LIEBAU Patented Mar. 1, 1949

2,462,979

UNITED STATES PATENT OFFICE 2,462,979

CLAMP ATTACHMENT FOR PORTABLE DRILLS

Frederick M. Liebau, Baltimore, Md., assignor of one-half to Bernard B. Feikin, Baltimore, Md.

Application September 11, 1945, Serial No. 615,645

4 Claims. (Cl. 77—7)

This invention relates to portable drills and more particularly to an attachment for a portable drill, said attachment being in the form of a clamping mechanism adapted to position the drill with reference to the work being drilled.

In drilling holes in overhead beams and the like, the operator not only is required to apply pressure to the drill necessary to accomplish the drilling operation but must also support the weight of the drill which in the case of the ordinary electric drill is substantial. The resulting awkwardness of the position of the operator as well as the additional weight he must support is highly fatiguing and consequently leads to poor efficiency. Moreover the difficulty of supporting the electric drill overhead greatly hinders in properly setting the drill both as to angle and position.

Therefore, a primary object of the present invention is to increase the efficiency and accuracy with which holes can be drilled by portable electric drills.

A further object of the invention is to reduce the amount of physical effort required on the part of the operator in holding the drill to the work, thus permitting the operator to concentrate his full attention upon the manner in which the holes are to be drilled. It will be readily apparent that the reduced physical effort on the part of the operator will permit increased drilling operations over a given period of time which will thus tend to reduce drilling costs.

The above objects are accomplished by providing an attachment for electric drills which permits supporting the drill in any desired position on a work piece. This attachment is characterized by its simplicity of construction, ease of operation, and its adaptability for use with many types of drills or tools of similar nature.

These and other objects of the present invention will become more apparent from the following description taken in connection with the accompanying drawing showing a preferred embodiment of the invention wherein:

Figure 1 is a front elevational view partially in section of a preferred embodiment of the present invention illustrated with a cooperating electric drill shown in dotted lines;

Figure 2 is a sectional view taken along line 2—2 of Figure 1;

Figure 3 is a detail elevational view of the tool carriage;

Figure 4 is a top plan view thereof;

Figure 5 is a side elevational view of the body member;

Figure 6 is a front elevational view thereof;

Figure 7 is a detail plan view of a component part of the present device; and

Figure 8 is a sectional view along line 8—8 of Figure 1.

The present invention broadly contemplates a body member slidably supporting a tool carriage which is provided with a clamping arrangement for holding an electric drill or like tool. A substantially U-shaped work engaging member or clamp is adjustably disposed at one end of the body member and a manually operated worm drive mechanism disposed at the other end of the body member. The worm drive cooperates with the body member and the tool carriage whereby to afford a convenient mechanism for adjusting the tool carriage with respect to the work engaged by the work engaging member.

Referring now to the drawing in detail, a tubular body member 17 having an external thread formed at its upper end, has a pair of diametrically opposed slots 25 formed in its wall and extending longitudinally downwardly for a considerable length from the top of the body member 17. Also formed in the top wall of the body member 17 are the relatively short diametrically opposed slots 30 arranged in quadrature to the slots 25. The lower end of the tubular body member 17 adjustably engages a work holding member consisting of a U-shaped member 32 having legs of unequal length, the shorter leg being provided with a normally projecting tubular extension 18. The tubular extension 18 is slidably telescoped into the lower end of the body member 17 and may be rigidly fixed in desired position by means of a set screw 33.

A tool carriage 10 includes a sleeve member 16 which slidably engages the body member 17, the sleeve member 16 having its upper end externally threaded and provided with a pair of diametrically opposed slots 31. An apertured cap member 26 engages the threaded portion of the sleeve 16 and locks to the sleeve member 16 a pair of extending arms 24 of a coupling member 23 as will be hereinafter more fully described. A tool clamp is welded or otherwise secured to the sleeve 16 and includes a pair of arcuate shaped jaw members 12 and 13. One pair of the aforesaid adjacent legs is provided with a joining hinge 14 whereas the other pair of legs is provided with corresponding registering openings which are engaged by a bolt 15 and a cooperating nut. Thus the jaws 12 and 13 and the cooperating hinge 14 and nut and bolt 15 afford a simple arrangement for supporting an electric drill 11 shown in dotted lines in Figure 1.

The tool carriage control mechanism includes an internally threaded member 28 provided with a pair of diametrically opposed outwardly projecting arms 29. The screw member 28 is disposed in the upper end of the body member 17, the arms 29 resting in the slots 30 and locked in position by the apertured cap 27. A worm or screw member 19 engages the internal thread of the member 28, extending into the body member 17 and pivotally engaging the coupling member 23 by means of a coaxial pin as seen in Figure 1. The projecting legs 24 of the coupling member 23 are secured to the sleeve 16 as has been heretofore set forth. It should also be noted that the arms 24 extend through the slots 25 formed in the body member 17, the slots 25 providing a guideway for the coupling member 23 in the transmission of the movement of the worm 19 to the tool carriage 10.

The upper portion of the screw member 19 is provided with a tapped coaxial projection 22 of square cross section, the projection 22 engaging a corresponding aperture formed in the cross bar of the crank 20. The crank 20 is provided with a handle 21 and is secured in position by a suitable screw and washer.

Considering now the operation of the device above described, an electric drill 11 is clamped to the tool carriage 10 as illustrated in Figure 1 of the drawing. If it is desired to drill a hole in an overhead beam, the work engaging member is brought into engagement with an edge of the beam in the proximity of the part it is desired to drill and the device is adjusted until the drill is immediately below such point. The worm 19 is then rotated clockwise by means of the crank 20, urging the tool carriage 10 along the body member 17 and bringing the electric drill 11 into operative engagement with the work piece. Thereafter the drilling operation is commenced. Adjustment of tubular member 18 within body member 17 may be made depending on the thickness of the work to be drilled.

Thus it will be seen that the construction herein shown and described is well adapted to accomplish the objects of the present invention. It will be understood, however, that the invention may be embodied otherwise than here shown and that in the form illustrated, certain minor changes may be made without departing from the spirit of the invention. Therefore, I do not wish to be limited precisely to the construction herein shown except as may be required by the appended claims considered with reference to the prior art.

What I claim and desire to secure by Letters Patent is:

1. An article of the character described comprising a tubular body member, a carriage provided with a tool clamping arrangement, said carriage having a tubular portion encircling said tubular body member, a nut coaxially mounted at one end of said body member, a rotatable screw engaging said nut and projecting into said body member, means for mechanically coupling said carriage tubular portion to said screw whereby the thrust of said screw upon rotation imparts a movement to said carriage along said body member, and a work engaging member positioned at the other end of said body member.

2. An article of the character described comprising a tubular body member, a carriage having a tubular portion encircling said tubular body member and provided with a hinged clamp adapted to support an electric drill, a nut coaxially mounted at one end of said body member, a rotatable screw engaging said nut and projecting into said body member, means for mechanically coupling said carriage tubular portion to said screw whereby the thrust of said screw upon rotation imparts a movement to said carriage along said body member, and a work engaging member having a projection extending into the other end of said body member.

3. An article of the character described comprising a tubular body member having a pair of diametrically opposed slots formed in the wall thereof, a tool carriage adapted to clamp to an electric drill and provided with a sleeve slidably engaging said body member, a nut coaxially mounted on said member, a screw engaging said nut and provided with a handle at its outer end whereby said screw may be axially moved in said body member by rotating said screw, a member provided with diametrically opposed arms extending through said slots formed in said body member and rotatably mounted on the inner end of said screw, said arms engaging said tool carriage whereby movement of said screw imparts a movement to said carriage with respect to said body member, and a work engaging member disposed at the other end of said tubular body member.

4. An article of the character described comprising a tubular body member having a pair of diametrically opposed slots formed in the wall thereof, a tool carriage adapted to clamp to an electric drill and provided with a sleeve slidably engaging said body member, said sleeve having a pair of opposed slots at one end thereof, said slots being in alignment with the slots of the tubular member, a nut coaxially mounted on said member, a screw engaging said nut and provided with a rotating handle at its outer end whereby said screw may be axially moved in said body member by rotating said screw, a member provided with diametrically opposed arms extending through the slots of the body member and swivelly mounted on the inner end of said screw, said arms engaging within the slots of the sleeve whereby movement of the screw imparts a longitudinal movement of said carriage with respect to said body member, and a work engaging member mounted at the other end of said tubular body member.

FREDERICK M. LIEBAU.

REFERENCES CITED

The following references are of record in the file of this patent:

UNITED STATES PATENTS

| Number | Name | Date |
| --- | --- | --- |
| 1,052,767 | Teague | Feb. 11, 1913 |
| 1,164,327 | Bergman | Dec. 14, 1915 |
| 1,926,788 | Park et al. | Sept. 12, 1933 |
| 2,261,746 | Seaboly | Nov. 4, 1941 |